UNITED STATES PATENT OFFICE.

JOSEPH CLARKE, OF SYRACUSE, NEW YORK.

IMPROVED COMPOSITION FOR PAVEMENTS, ROOFING, &c.

Specification forming part of Letters Patent No. 44,938, dated November 8, 1864.

*To all whom it may concern:*

Be it known that I, JOSEPH CLARKE, of Syracuse, of Onondaga county, in the State of New York, have invented a certain new and useful Composition for Pavements, Floors, and Roofs; and I do hereby declare that the following is a full, clear, and exact description of the mode of making and applying the same.

I first take distilled coal-tar or asphaltum, or pine-pitch, and boil it down, so that it may dry easily and be deprived of its offensive smell, and mix in with it boiled hydraulic cement and plaster-of-paris. This boiled pitch is melted in a large vessel. I then stir into it about one-seventh part of gravel and sand or broken hard brick or cinders. This composition is then ladled out upon the pavement, floor, or roof, and is rolled flat and smooth. I then take hydraulic cement and plaster-of-paris in equal parts, and dry-boil them together. I then take about one-twentieth part of this composition and sift it over the still warm and sticky surface of the pavement.

The cement-and-plaster composition serves to make the pavement set or harden the quicker, helps to destroy the smell, and forms a yellowish color, more pleasant to the eye and less absorbent of heat than the uncolored black pitch composition.

A pavement, roof, or floor prepared in this manner is hard, water-proof, and cheap and durable.

Having thus fully described my invention, what I claim as new, and desire to secure by Letters Patent, is—

The manner herein described of making and laying composition pavements, roofs, and floors.

JOSEPH CLARKE.

Witnesses:
 Jo. C. CLAYTON,
 V. C. CLAYTON.